United States Patent
Di Martino

(10) Patent No.: US 7,967,352 B2
(45) Date of Patent: Jun. 28, 2011

(54) LOAD SPREADER BAR END CAP

(75) Inventor: John Michael Di Martino, New Bern, NC (US)

(73) Assignee: Tandemloc, Inc., Havelock, NC (US)

( * ) Notice: Subject to any disclaimer, the term of this patent is extended or adjusted under 35 U.S.C. 154(b) by 558 days.

(21) Appl. No.: 12/055,826

(22) Filed: Mar. 26, 2008

(65) Prior Publication Data

US 2009/0058117 A1    Mar. 5, 2009

Related U.S. Application Data

(60) Provisional application No. 60/970,041, filed on Sep. 5, 2007.

(51) Int. Cl.
*B66C 1/00* (2006.01)

(52) U.S. Cl. .......................... 294/81.1; 294/74

(58) Field of Classification Search ............... 294/81.1, 294/81.5, 74
See application file for complete search history.

(56) References Cited

U.S. PATENT DOCUMENTS

| | | | |
|---|---|---|---|
| 160,301 A | 3/1875 | Brancher et al. | |
| 367,578 A | 8/1887 | Babb | |
| 1,970,617 A * | 8/1934 | Morgan | 294/81.21 |
| 3,206,243 A | 9/1965 | Miles | |
| 3,362,167 A * | 1/1968 | Ward | 405/282 |
| 3,822,850 A * | 7/1974 | Elias | 248/551 |
| 3,851,856 A * | 12/1974 | Berg | 254/93 R |
| 4,215,891 A | 8/1980 | Thiele | |
| 4,396,095 A * | 8/1983 | Wernli et al. | 188/65.3 |
| 4,538,849 A | 9/1985 | Khachaturian et al. | |
| 4,736,976 A * | 4/1988 | Berzenye | 294/82.1 |
| 4,842,314 A | 6/1989 | Bellow | |
| 4,909,555 A * | 3/1990 | Blasi | 452/189 |
| 5,116,341 A * | 5/1992 | Cameron | 294/67.3 |
| 5,310,290 A * | 5/1994 | Spencer | 405/283 |
| 5,603,544 A | 2/1997 | Bishop et al. | |
| 5,863,085 A | 1/1999 | Khachaturian | |
| 6,079,760 A | 6/2000 | Khachaturian | |
| 6,296,288 B1 | 10/2001 | Khachaturian | |
| 6,390,523 B2 * | 5/2002 | Fujikawa et al. | 294/82.11 |
| 6,467,741 B1 * | 10/2002 | Shih | 248/200.1 |
| 7,387,470 B2 * | 6/2008 | McCracken | 405/272 |
| 7,584,932 B2 * | 9/2009 | Shih | 248/354.3 |
| 7,708,072 B1 * | 5/2010 | Hunziker | 166/301 |
| 2005/0199567 A1 | 9/2005 | Tardiff | |

\* cited by examiner

*Primary Examiner* — Saúl J Rodríguez
*Assistant Examiner* — Stephen Vu
(74) *Attorney, Agent, or Firm* — Ward and Smith, P.A.

(57) ABSTRACT

A spreader bar end cap for use in a spreader bar assembly. The spreader bar end cap may include a flange having a first side and a second side, the second side including a groove adapted for receiving an end of a spreader pipe, wherein the groove extends outward from the flange to capture the end of the spreader pipe; a shackle connection part extending from the flange first side and adapted for attachment to a lifting mechanism; and an insertion part comprising a distal end extending from the flange second side and comprising a shoulder on the distal end, the shoulder being adapted for abutment with an inside diameter of the spreader pipe. Alternatively, the groove may recesses into the flange to capture the end of the spreader pipe.

10 Claims, 6 Drawing Sheets

LOAD SPREADER BAR END CAP

CROSS REFERENCE TO RELATED APPLICATION

This application is related to and claims priority to U.S. Provisional Application Ser. No. 60/970,041, filed Sep. 5, 2007, the disclosure of which is specifically incorporated by reference herein.

FIELD OF THE INVENTION

The present invention relates generally to a load spreader bar end cap typically used in the shipping and container industry for the lifting and supporting of cargo.

BACKGROUND OF THE INVENTION

In the related and relevant "below the hook" art technology, shipping containers and similar loads are typically lifted by means of a "spreader bar" assembly that can generally consist of end caps that insert into each end of a pipe segment wherein the end caps are connected by a "Y" cable to a crane or other lifting mechanism. Spreader bar assemblies of various lengths can be made by using pipe connections in-between different lengths of pipe.

A variety of prior art patent documents relate to spreader bar assemblies or couplings for connecting a range of pipe segments. For instance, U.S. Pat. No. 160,301 to Brancher et al. and U.S. Pat. No. 367,578 to Babb are related to pipe couplings. Referring specifically to FIG. 4 in Brancher, a pipe connector is shown for joining two sections of pipe. Babb also discloses an apparatus for coupling two sections of pipe with reference to FIGS. 2 and 3. However, the coupling devices shown in these two references are merely indicative of known prior devices for joining two segments of pipe.

Four patent documents in the name of Khachaturian relate to spreader bar assemblies. Namely, U.S. Pat. No. 4,538,849 discloses an adjustable spreader bar assembly having end portions which can be removably fitted to the ends of a section of pipe. The end caps disclosed in this patent can be most readily seen in FIGS. 4 through 11.

U.S. Pat. No. 5,863,085 describes another spreader bar assembly including a rigid elongated support bar to which a pair of end caps is removably connected wherein the end caps have sockets that fit over the ends of the bar. Each of the end caps also includes three pins mounted on a pair of longitudinally extending plates on the extreme end of each of the end caps for the attachment of slings directly to these pins for the elimination of the need for shackles.

U.S. Pat. Nos. 6,079,760 and 6,296,288 relate to a multi-part spreader bar arrangement including a plurality of connectible sections including at least a pair of bar sections and a pair of end caps and also including detachable connections between the connectible sections. Referring specifically to the figures, the couplings and end caps disclosed in this patent are of threaded engagement.

Several other patent documents are of background interest as they relate to spreader bar assemblies. For example, U.S. Pat. No. 3,206,243 to Miles discloses a spreader bar system comprising end caps which are moveable under a load through a pivotal connecting link in order to lock the tips of the end caps in a load lifting position to protect against the possibility of the end caps sliding.

U.S. Pat. No. 4,215,891 to Thiele discloses a sling mounting head having a solid central section, a retaining boss extending rearwardly from a rear face of the central section and insertable into a tubular end of a pipe, and two fork plates extending forwardly from a front face of a central section. The fork plates are provided with holes through which a connecting pin releaseably extends for connecting sling chains to the device.

U.S. Pat. No. 4,842,314 to Bellow discloses a pipe lift cap assembly including typical end caps for connection to a spreader bar.

U.S. Pat. No. 5,603,544 to Bishop et al. describes a compression cap assembly for a spreader pipe including end caps which are rigged to a spreader pipe and compressed onto the pipe through the use of bolts and the like, as shown in FIGS. 2 and 3.

Finally, U.S. Patent Application Publication No. 2005/0199567 to Tardiff discloses a spreader bar apparatus including a plurality of pipe sections which are connected through the use of a coupling wherein the coupling is connected to the pipe segments through the use of removable pins, as shown in FIGS. 1, 3, and 6.

Several disadvantages are known in the prior art. Generally, the installation or detachment of items for use in different lifts is a time consuming and laborious process. Usually, a user must stock pile various sized completed assemblies (spreader pipes attached to end caps, etc.) in order to handle different sized loads. Additionally, it is known that many of these prior art assemblies are made in permanent assemblies, such as end caps welded to spreader pipes, or in a manner that is difficult to assemble/disassemble (a multitude of bolts and nuts, etc.). Even further, it is known that tremendous pressures can be applied to the spreader bar systems during use and the prior art assemblies have been known to fail under such pressures, especially at mid-span joints, due to improper seating of junctions. As such, there remains a need for a load spreader bar system that allows for quick connect and disconnect of load end caps and optional pipe connection sleeves and reducer sleeves in order to allow for easier transport of long spreaders with different diameter pipes.

SUMMARY OF THE INVENTION

The present invention is directed to solve several disadvantages of prior art assemblies. Embodiments consistent with the present invention provide an improved spreader bar end cap comprising a flange having a first side and a second side, the second side comprising a groove adapted for receiving an end of a spreader pipe, a shackle connection part extending from the flange first side and adapted for attachment to a lifting mechanism shackle, and an insertion part comprising a distal end extending from the flange second side and comprising a shoulder on the distal end, the shoulder being adapted for abutment with an inside diameter of the spreader pipe.

According to an aspect of the invention, the end cap may comprise a fastener mechanism for securing the distal end to spreader pipes. For instance, the fastener mechanism may comprise a pin. The insertion part may be removable from the spreader pipe to allow use with other pipes. The shoulder may comprise a machined end plate.

Another or the same embodiment may include a groove that extends outward from the flange to capture the end of the spreader pipe. The groove may recess into the flange to capture the end of the spreader pipe.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the underlying principles of the present invention include an improved spreader bar assembly, and more specifically, an end cap and pipe connection sleeve that increase the efficiency of using and assembling a spreader bar assembly. A spreader bar assembly may include an end cap having a shackle connection part and an insertion part adapted for detachable connection to a spreader pipe. A connection sleeve may include multiple insertion ends for respective connection to respective spreader pipes. Where so configured, the pipes may have different diameters. Embodiments may provide a system to quickly connect or disconnect the end lift points with the pipe connection and reducer sleeves.

Figure 1:
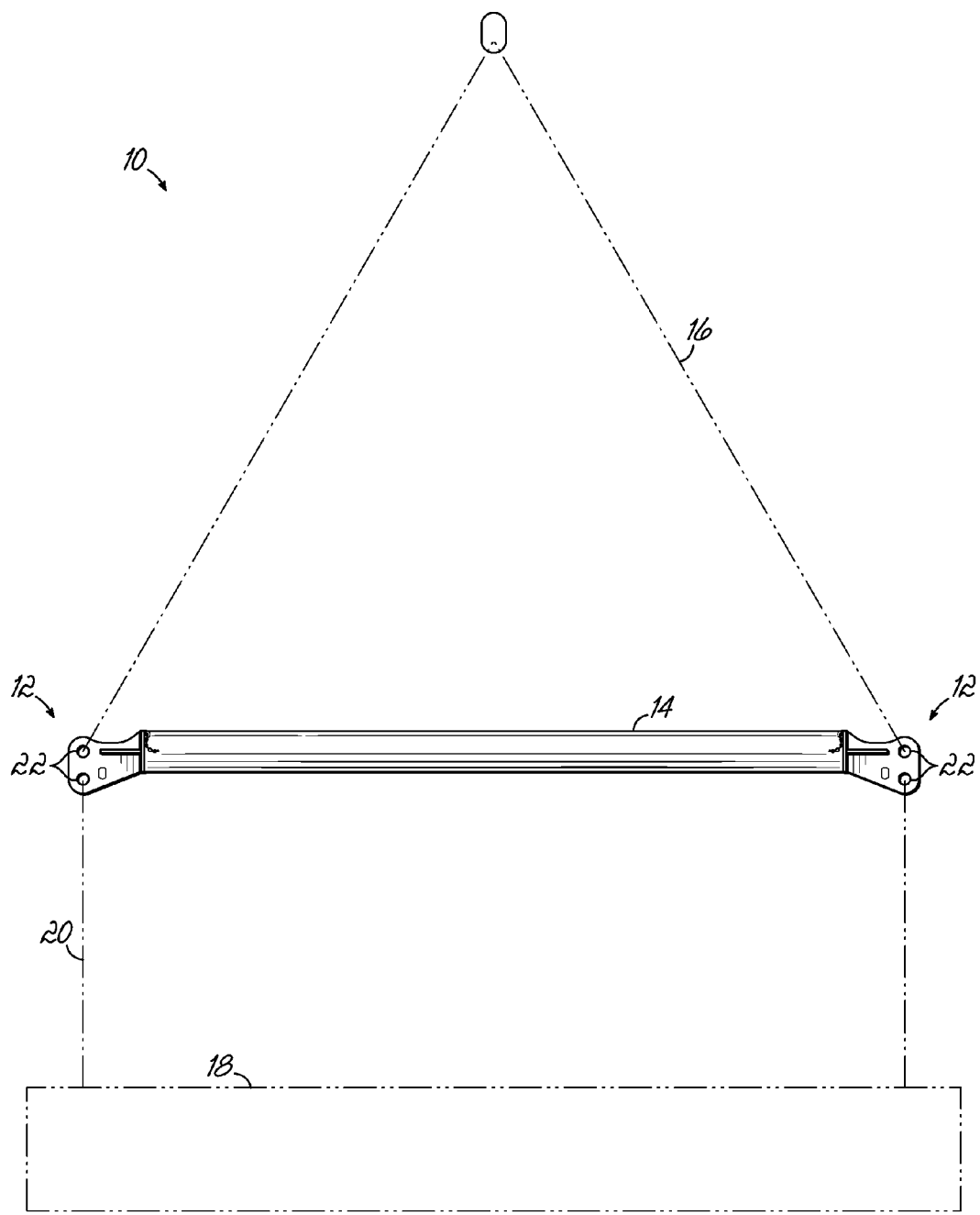
FIG. 1 shows a spreader bar assembly that includes end caps connected to the ends of the spreader bar pipe in a manner that is consistent with the present invention.

In a first embodiment, FIG. 1 shows a spreader bar assembly 10 comprising an end cap 12 and a single spreader bar 14. The spreader bar assembly 10 typically attaches to some lift mechanism, such as a crane, via Y-cables 16. The cables 16 and the assembly 10 may be capable of lifting and holding a load or cargo 18 beneath the spreader bar assembly 10 and attached thereto with additional cables 20. The cables 16, 20 may be attached to the end caps 12 at connection points 22 at the end of each end cap 12.

Figure 2:
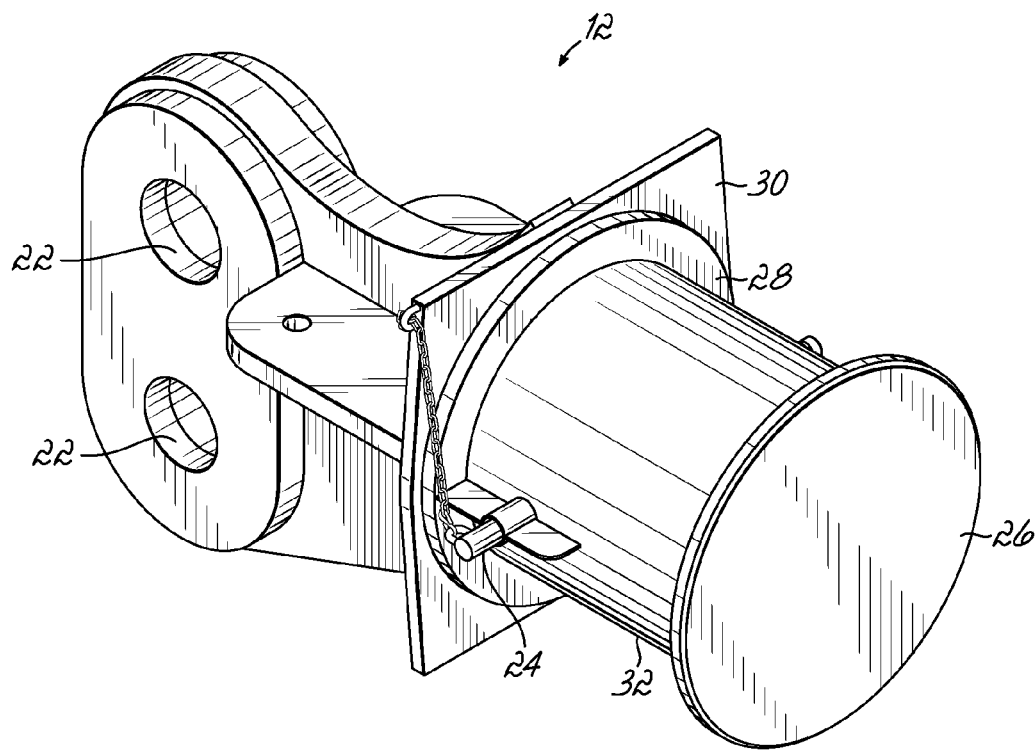
FIG. 2 shows a perspective view of the end cap shown in FIG. 1.
Figure 3:
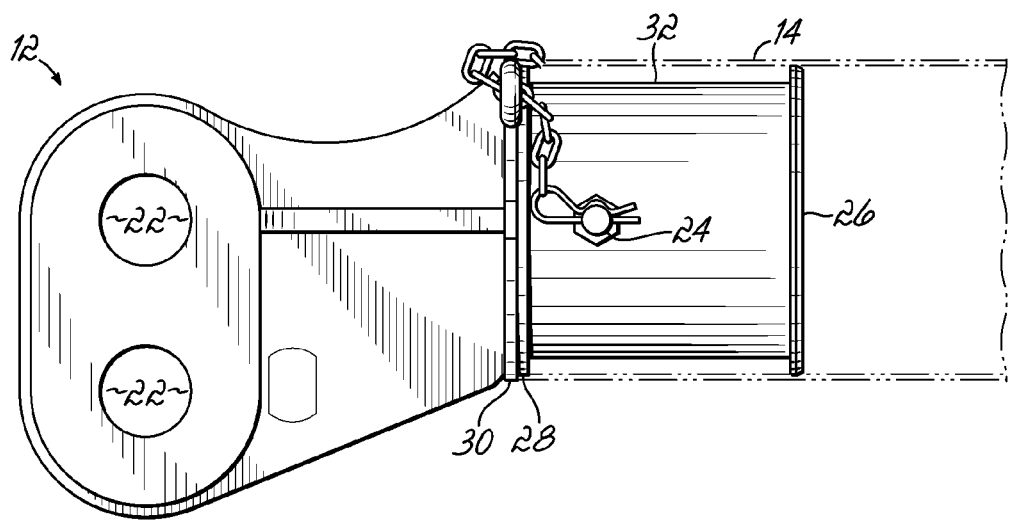
FIG. 3 shows a side view of the end cap shown in FIGS. 1 and 2.

FIGS. 2 and 3 show details of the end cap 12 of FIG. 1 as contemplated in the present invention. The spreader bar 14 to which the end cap 12 attaches is shown with hash marks 14 (see FIG. 3). The first side of the end cap 12 can include connection points 22 comprising, for example, circular holes for the attachment of the load cables 16, 18. The second side of the end cap can include a circular extension 32 extending from a flange 30 in the middle of the end cap 12. A machined plate 26 at the end of the circular extension 32 may fit against the inner diameter of the spreader bar pipe 14 into which the end cap 12 inserts and connects. A groove 28 extending as a shoulder from the flange 30 captures the cut-end diameter of the spreader bar pipe 14. It is also envisioned that the groove may consist of a recessed groove (i.e., cut in to the flange), such as described with reference to the second and third embodiments hereinbelow, wherein pipe cut-ends are captured in the groove. The grooves allow the pipe cut-ends to be captured in such a manner as to reinforce the cut-ends and act to increase the load capability of the piping while not required permanent affixment such as by welding.

The second end of the end cap can also include a pin assembly 24 for connection of the end cap to the spreader bar pipe 14. The pin assembly 24 includes a hole in the circular extension 32 for insertion of the pin and that corresponds to holes in the spreader bar pipe 14, the pin itself, and a chain attaching the pin to the end cap 12.

Figure 5:
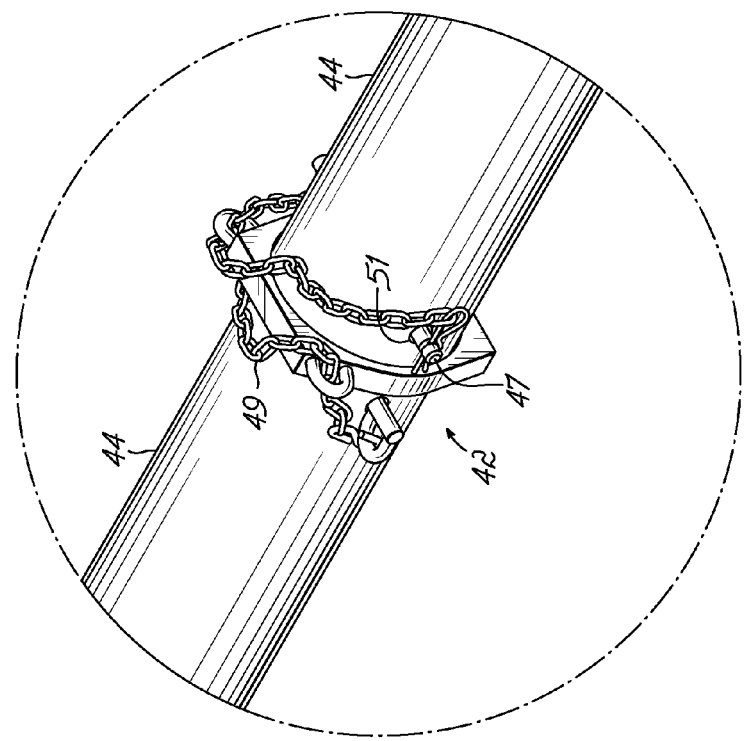
FIG. 5 shows a more detailed perspective view of the pipe connection sleeve and connected spreader bar pipes shown in FIG. 4.
Figure 4:
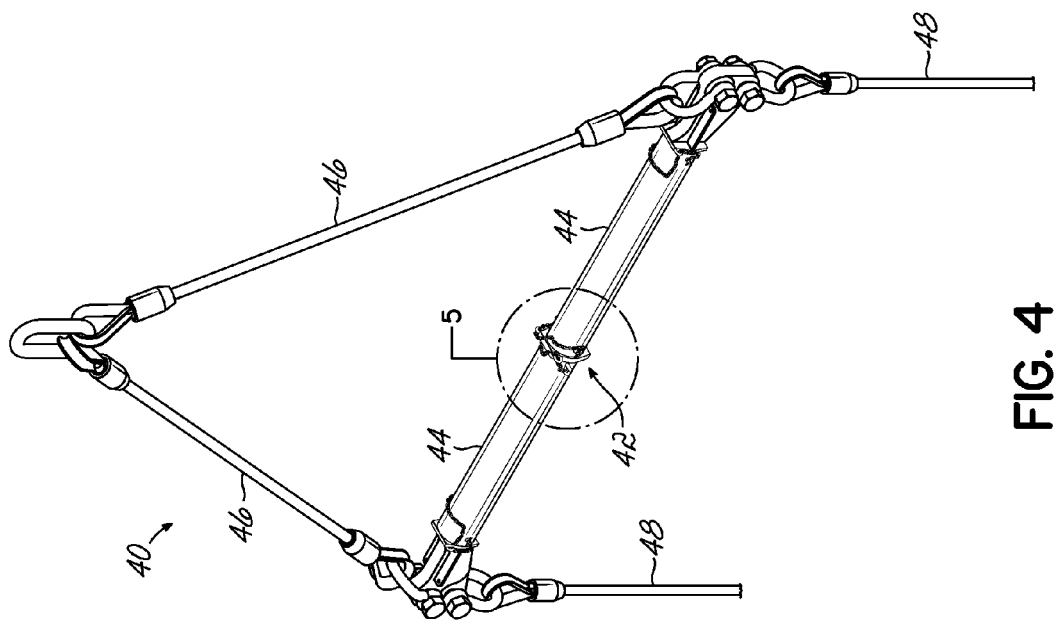
FIG. 4 shows a perspective view of a spreader bar assembly that shows a connection sleeve connecting spreader bar pipes together in a manner that is consistent with the present invention.
Figure 6:
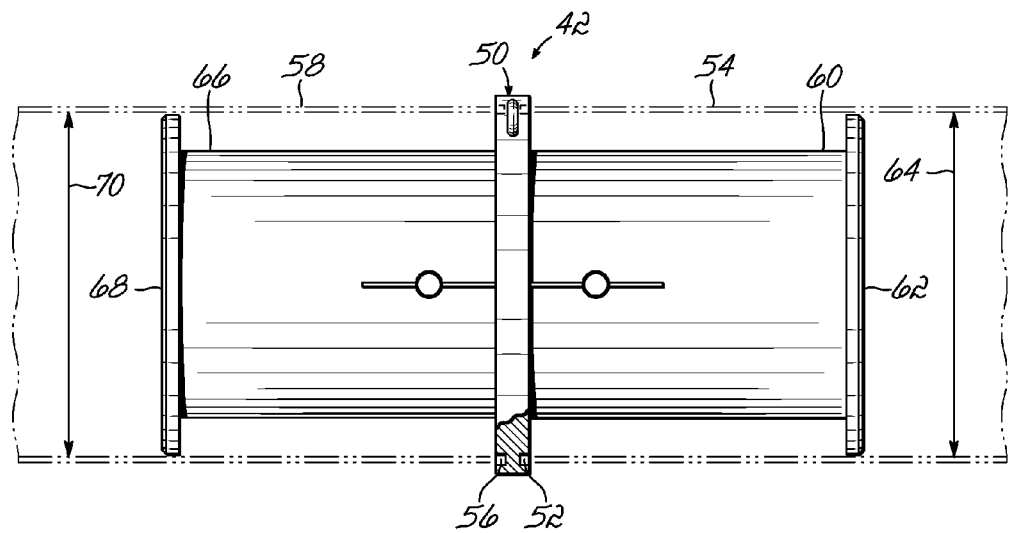
FIG. 6 shows a side view another end cap that is consistent with the present invention.
Figure 9:
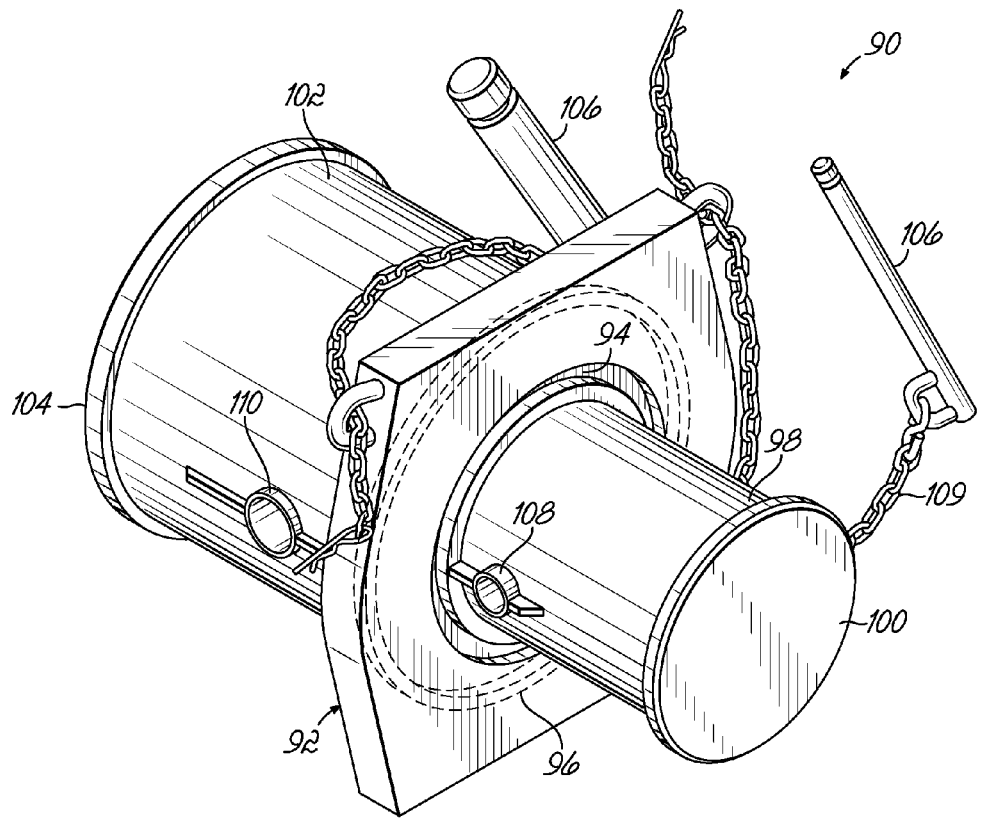
FIG. 9 shows a perspective view of the pipe connection sleeve of FIG. 8.
Figure 8:
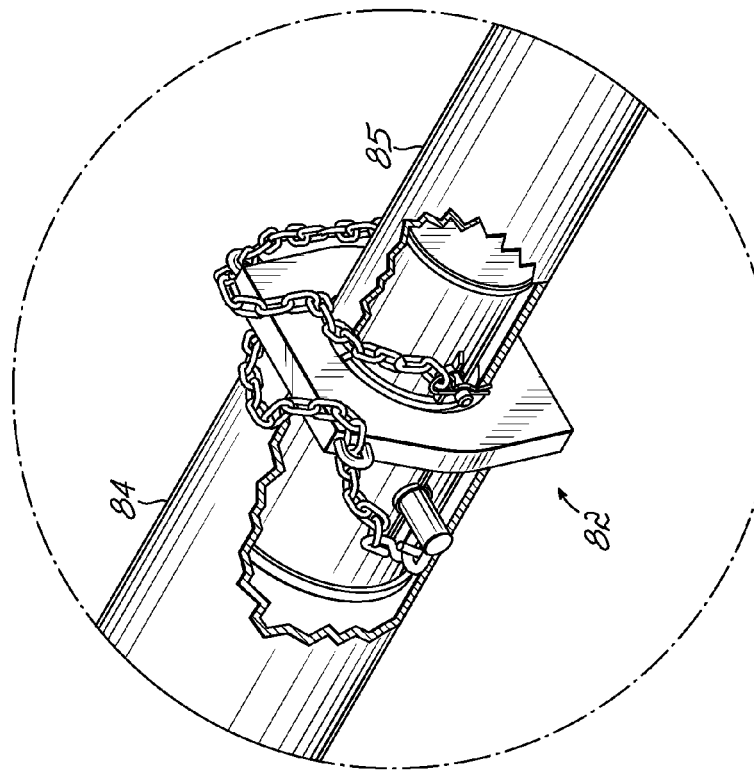
FIG. 8 shows a more detailed perspective view of the pipe connection sleeve and connected spreader bar pipes shown in FIG. 7.
Figure 7:
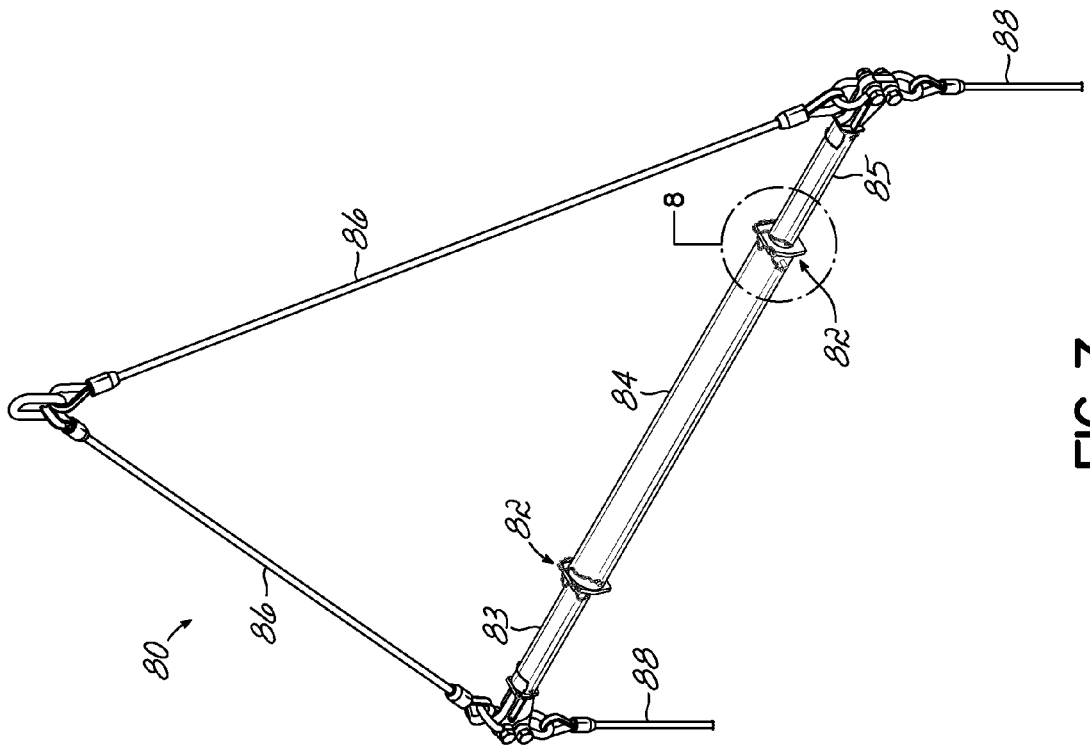
FIG. 7 shows a perspective view of a spreader bar assembly that includes a pipe reducing connection sleeve connecting spreader bar pipes of different sizes together in a manner that is consistent with the present invention.
Figure 10:
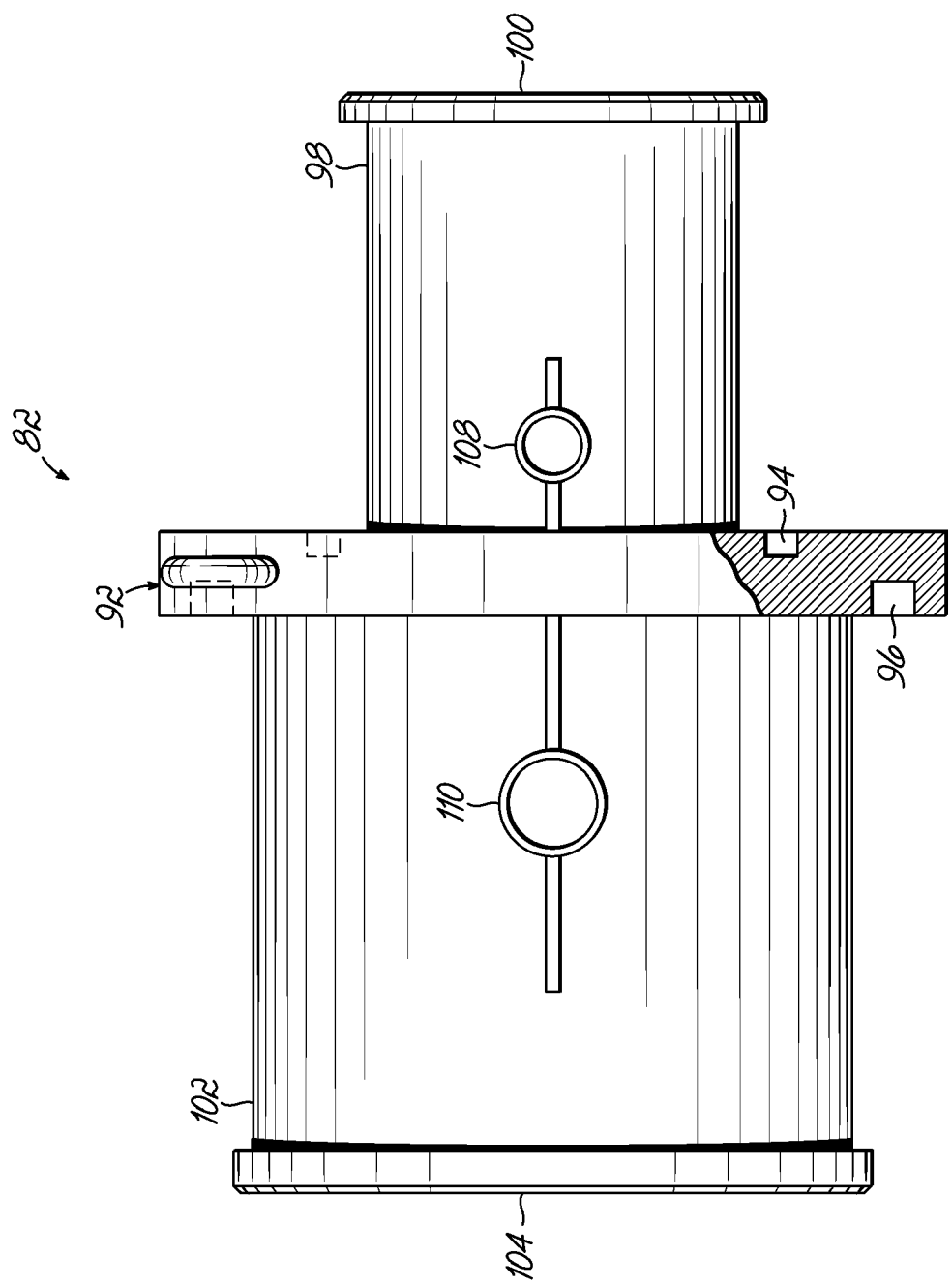
FIG. 10 shows a side view of a pipe connection sleeve with the connection mechanism on each side of the pipe connection sleeve used to connect spreader bar pipes of different sizes and diameters in a manner that is consistent with the present invention.

A second embodiment of the invention is shown in FIGS. 4, 5, and 6. This embodiment includes a pipe connection sleeve 42, similar to the end cap 12 discussed in the first embodiment above, to be used in connecting together two spreader bars 44 of similar size and diameter. This spreader bar assembly 40 contemplated by this embodiment includes the pipe connection sleeve 42, and two or more spreader bars 44 of the same or similar size and diameter joined together by the pipe connection sleeves 42. The assembly 40 further includes Y-cables 46 attaching the spreader bars 44, and a pipe connection sleeve 42 to a lift mechanism such as a crane, and cables 48 attaching the spreader bar and pipe connection sleeve to some form of load to be lifted or held.

Similar to the end cap 12 described above in the first embodiment, the second side of the pipe connection sleeve 42 in this second embodiment may include a flange 50 in the middle and a groove 52 at the flange 50 to capture the cut-end diameter of the first spreader bar pipe 54. While they both capture the cut-end of a spreader pipe, groove 52 as shown in FIG. 6 is different than that shown with reference to FIG. 2 (depicting an extending shoulder groove) in that it is recessed inwardly in flange 50. It is understood, however, that the groove may be a recessed groove, an extending shoulder groove, or a combination of both. The sleeve 42 may also include a circular extension 60 from the flange 50 and an end plate 62 at the end of the circular extension 60 for capturing the inner diameter 64 of the first spreader bar pipe 54. Unlike the first embodiment, the first side of the pipe connection sleeve 42 may be substantially a symmetrical duplicate of the second side. The sleeve 42 may connect to a second spreader bar pipe 58 of the same size as the first spreader bar pipe 54 in the spreader bar assembly 40. This first side may include a groove 56 at the flange 50 to capture the cut-end diameter 70 of the second spreader bar pipe 58. The first side may also include a circular extension 66 from the flange 50 and an end plate 68 at the end of the circular extension 66 to capture the inner diameter 70 of the second spreader bar pipe 58.

Similar to those described above in the first embodiment individual pipe connection sleeve 42 may also includes pin assemblies or other mechanism on each side of the middle flange 50 for connecting the pipe connection sleeve 42 to each spreader bar pipe 44. Each spreader bar pipe can have matching holes in the pipe connection sleeve 42 to receive the connecting pins. The pins themselves may be attached to the pipe connection 42 sleeve via chains.

A third embodiment of the present invention is shown in FIGS. 7, 8, 9 and 10. This third embodiment contemplates a pipe connection sleeve 82 for connecting spreader bars 83, 84, 85 of different sizes and diameters. Similar to the other spreader bar assemblies discussed herein, this spreader bar assembly 80 can include pipe connection sleeves 82, the spreader bars 83, 84, 85 and Y-cables 86 for attaching the spreader bars and sleeves to a lifting mechanism (not shown). The assembly 80 can also include cables 88 for attaching the spreader bars and pipe connection sleeves to some form of a load.

The pipe connection sleeve 82 may include a middle flange 92. The second side of the pipe connection sleeve 82 includes a circular extension 98 from the flange 92. The extension 98 may include an end plate 100 for connecting with the inner diameter of the first spreader bar pipe 85, and a groove 94 at the flange 92 for capturing the cut-end diameter of the first spreader bar pipe 85.

Unlike the first embodiment described above, the first side of the pipe connection sleeve 82 includes a circular extension 102 from the flange 92 with an end plate 104 at the end for connecting with the inner diameter of the second spreader bar pipe 84, and a groove 96 at the flange 92 for capturing the cut-end diameter of the second spreader bar pipe 84. The circular extension 102, end plate 104, and groove 96 on the second side may be of different sizes and diameters than the circular extension 98, end plate 100, and groove 94 on the first side for the purpose of connecting to a second spreader bar 84 of different size and diameter than the first spreader bar 85. As described with reference to the first and second embodiments above, it is understood that the grooves may be a recessed groove, an extending shoulder groove, or a combination of both.

The circular extensions 98, 102 can include holes 108, 110 for receiving connection pins 106 that connect the pipe connection sleeve to the spreader bars. The pins 106 can be connected to the pipe connection sleeve 82 via chains 109.

While the present invention has been illustrated by a description of various embodiments and while these embodiments have been described in considerable detail, it is not the intention of the Applicant to restrict, or, in any way limit the scope of the appended claims to such detail. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. An end cap for use in a spreader bar assembly, the end cap comprising:
    a) a flange having a first side and a second side, the second side comprising a groove adapted for receiving an end of a spreader pipe, wherein the groove extends outward from the flange to capture the end of the spreader pipe;
    b) a shackle connection part extending from the flange first side and adapted for attachment to a lifting mechanism; and
    c) an insertion part comprising a distal end extending from the flange second side and comprising a shoulder on the distal end, the shoulder being adapted for abutment with an inside diameter of the spreader pipe.

2. The end cap of claim 1 further comprising a fastener mechanism for securing the distal end to the spreader pipe.

3. The end cap of claim 2 wherein the fastener mechanism comprises a pin.

4. The end cap of claim 1 wherein the insertion part is removable from the spreader pipe.

5. The end cap of claim 1 wherein the insertion part shoulder comprises a machined end plate.

6. An end cap for use in a spreader bar assembly, the end cap comprising:
    a) a flange having a first side and a second side, the second side comprising a groove adapted for receiving an end of a spreader pipe, wherein the groove recesses into the flange to capture the end of the spreader pipe;
    b) a shackle connection part extending from the flange first side and adapted for attachment to a lifting mechanism; and
    c) an insertion part comprising a distal end extending from the flange second side and comprising a shoulder on the distal end, the shoulder being adapted for abutment with an inside diameter of the spreader pipe.

7. The end cap of claim 6 further comprising a fastener mechanism for securing the distal end to the spreader pipe.

8. The end cap of claim 7 wherein the fastener mechanism comprises a pin.

9. The end cap of claim 6 wherein the insertion part is removable from the spreader pipe.

10. The end cap of claim 6 wherein the insertion part shoulder comprises a machined end plate.

* * * * *